McC. Young.
Harvester Rake.
Nº 21,587 — Patented Sep. 21, 1858.

UNITED STATES PATENT OFFICE.

McCLINTOCK YOUNG, JR., OF FREDERICK CITY, MARYLAND.

IMPROVEMENT IN HARVESTERS.

Specification forming part of Letters Patent No. 21,587, dated September 21, 1858.

*To all whom it may concern:*

Be it known that I, McCLINTOCK YOUNG, Jr., of Frederick City, in the State of Maryland, have invented a new and Improved Rake for Harvesters; and I do hereby declare that the following is a correct description of the same, reference being had to the accompanying drawings, in which—

Figure 1:
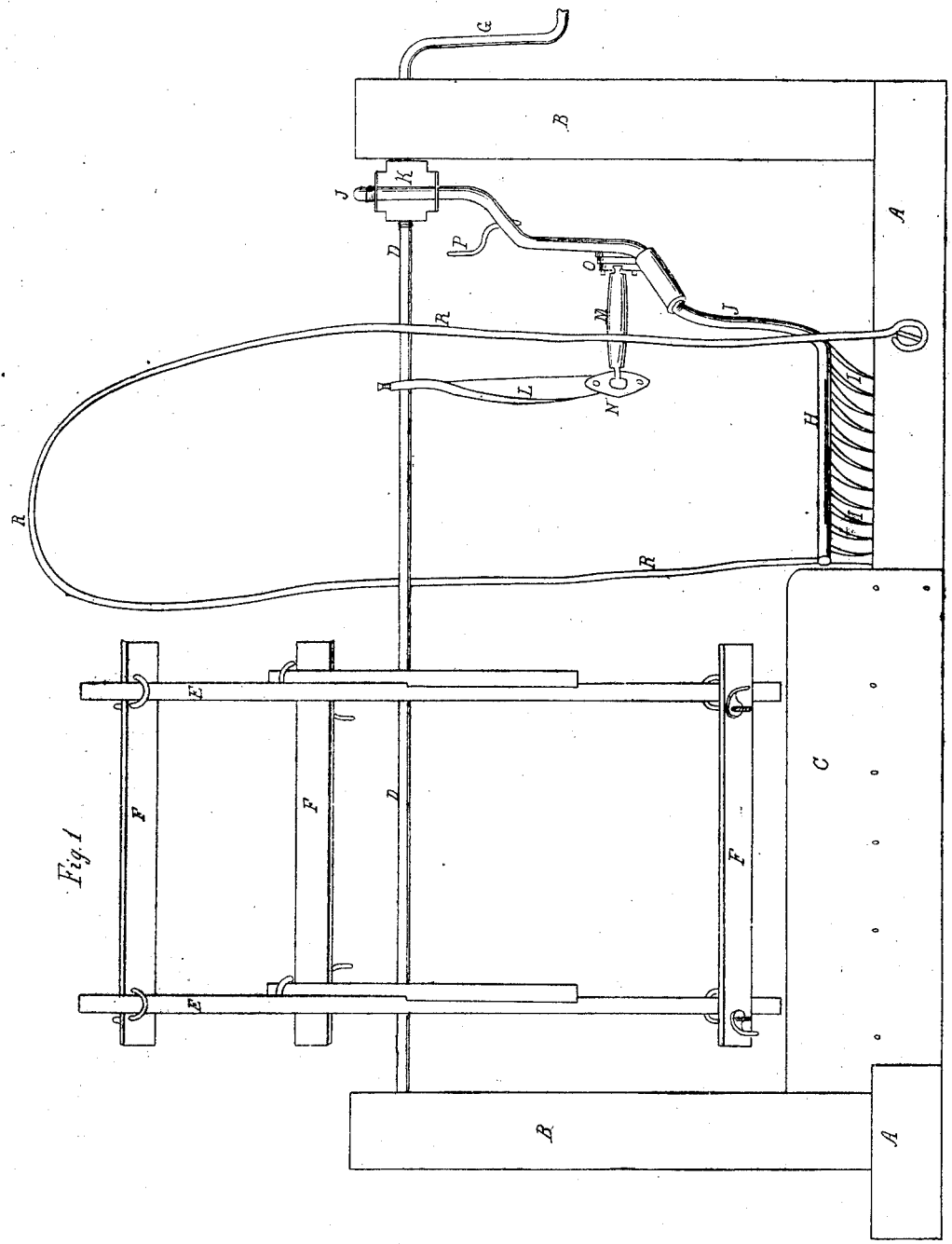
Figure 2:
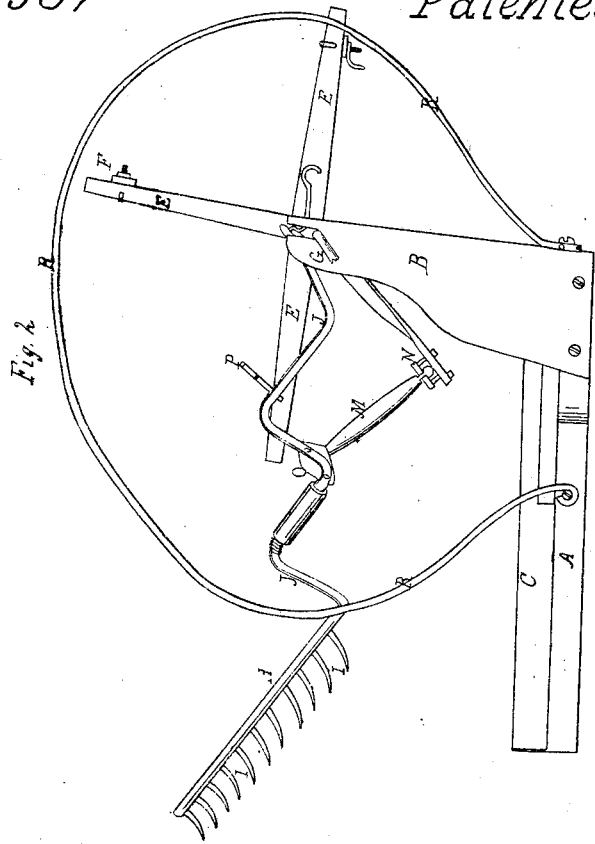
Figure 3:
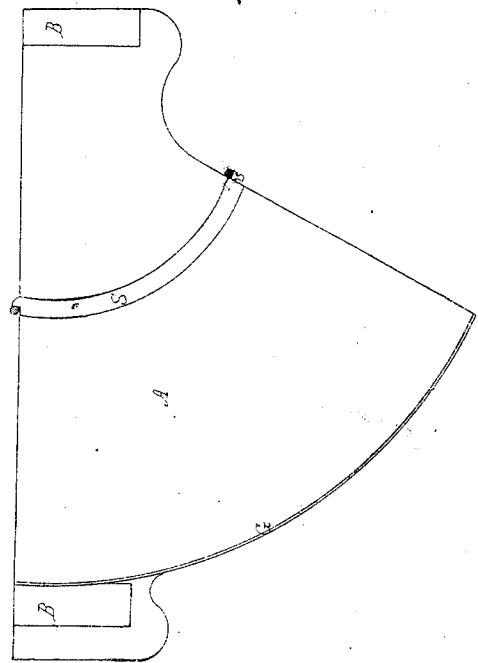
Figure 4:

Figure 1 is a rear elevation of the platform of a harvester having my improved rake applied. Fig. 2 is an end elevation of the same on a smaller scale. Fig. 3 is a plan of the platform, and Fig. 4 is a separate view of the pitman.

The same part is marked, wherever it occurs, by the same letter.

The nature of my invention consists in the new arrangements for operating the rake of harvesting-machines, hereinafter more particularly described, whereby the cut grain is delivered in gavels at the side of the machine in the path which has been passed over by the team, while the rake is, during every part of its operation, confined within the limits of the platform, and does not interfere with any of the operative parts or prevent the driver from being seated on the machine.

In the drawings, A marks the platform of the machine; B, stanchions supporting the reel-shaft; C, rim or guard around outer edge of platform; D, shaft of reel; E, arms of reel; F, gatherers of reel; G, winch on end of reel-shaft; H, rake-bar; I, rake-teeth; J, bent handle of rake; K, universal joint; L, arm attached to shaft D by adjusting-screw *a*; M, pitman united to arm L and handle J by ball-and-socket joints; N and O, ball-and-socket joints; P, stop; R, guide for rake; S, arc on platform.

The shape of the platform is shown in Fig. 3. The rake is of the usual form. The bar H, in which its teeth I are set, is prolonged, so as to form a handle, J, bent in the manner shown. This handle is attached to the reel-shaft D by the universal joint K. On shaft D is an arm, L, which is adjusted to the required position by the set-screw *a*. The lower end of this arm has a socket for the reception of a ball on the end of pitman M. The pitman M is attached in a similar way to the rake-handle J at the point O. On the handle J is a stop, P, which keeps the rake from falling below the horizontal position at the highest point in its revolution. The reel is formed in the usual way with arms E and gatherers F; but, the height of the reel-shaft being fixed and unchangeable, I make the gatherers adjustable on the arms to suit the height of the grain to be cut. This is done by attaching the gatherers to the arms by staples fitting the arms loosely, so that the gatherers may be placed at any required distance from the reel-shaft. They may be fixed at the desired point by set-screws passing through the staple, or by wedges inserted between the staples and the arms. While on the platform the rake moves between the rim or guard C and the arc S. When it leaves the platform it is guided in its revolution by the guard or guide R.

The operation is as follows: As the machine is drawn along its path the reel-shaft D is caused to revolve by any suitable gearing from the driving-wheel, applied at the point where the winch G is shown in the drawings. The operation may be supposed to commence when the rake is at the rear of the platform, as shown in Fig. 1. The revolution of shaft D causes the rake to rise along the guide R. When it has attained its highest point it falls to a horizontal position, being prevented from falling farther by the stop P, which rests on the top of shaft D. It is then in a position parallel to the gatherers, and so continues till it reaches the front of the platform, when it passes in a radial sweep across it, delivering the cut grain in a neat gavel at the side of the platform, in the rear of the path of the team.

Having thus described my invention, what I claim, and desire to secure by Letters Patent, is—

1. The combination of the handle J, shaft D, arm L, pitman M, and guide R, or their equivalents, when arranged and operated substantially in the manner and for the purpose specified.

2. Making the gatherers F adjustable on the arms E of the reel, as and for the purpose specified.

In testimony whereof I have hereunto set my hand this 2d day of September, A. D. 1858.

McCLINTOCK YOUNG, JR.

Witnesses:
JNO. G. THOMPSON,
CHAS. F. STANSBURY.